(12) United States Patent
Murray et al.

(10) Patent No.: US 12,067,799 B2
(45) Date of Patent: Aug. 20, 2024

(54) CAMERA ENVIRONMENT MAPPING

(71) Applicant: Microsoft Technology Licensing, LLC, Redmond, WA (US)

(72) Inventors: Justin Murray, Redmond, WA (US); Timothy Clifford, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 257 days.

(21) Appl. No.: 17/063,350

(22) Filed: Oct. 5, 2020

(65) Prior Publication Data
US 2021/0019510 A1 Jan. 21, 2021

Related U.S. Application Data

(63) Continuation of application No. 16/244,745, filed on Jan. 10, 2019, now Pat. No. 10,832,045.

(51) Int. Cl.
*G06V 40/10* (2022.01)
*G06T 7/543* (2017.01)
*G06T 7/73* (2017.01)

(52) U.S. Cl.
CPC ............ *G06V 40/103* (2022.01); *G06T 7/543* (2017.01); *G06T 7/73* (2017.01)

(58) Field of Classification Search
None
See application file for complete search history.

(56) References Cited

U.S. PATENT DOCUMENTS

| | | | |
|---|---|---|---|
| 6,741,279 B1 * | 5/2004 | Allen | G01B 11/2513 |
| | | | 348/222.1 |
| 2018/0285634 A1 * | 10/2018 | Varadarajan | G06V 10/764 |

OTHER PUBLICATIONS

Raskar (iLamps: Geometrically Aware and Self-Configuring Projectors, SIGGRAPH 2003) (Year: 2003).*
Matlab ("https://www.mathworks.com/help/vision/ug/fisheye-calibration-basics.html" available 2018) (Year: 2018).*
EquationOfAPlane, https://brilliant.org/wiki/3d-coordinate-geometry-equation-of-a-plane/ available as of 2015 (Year: 2015).*
"Office Action Issued in European Patent Application No. 19845889. 5", Mailed Date: May 17, 2023, 5 Pages.

* cited by examiner

*Primary Examiner* — Mark Roz
(74) *Attorney, Agent, or Firm* — Schwegman Lundberg & Woessner, P.A.

(57) ABSTRACT

Systems and methods may be used to map an environment. A method may include receiving frames of video data from a camera. The method may include identifying an object in at least two of the frames to identify an axis of the object. The axis may be used to generate a plane map.

19 Claims, 5 Drawing Sheets

CAMERA ENVIRONMENT MAPPING

CROSS REFERENCE TO RELATED APPLICATION

This application is a continuation application of, and claims the benefit of priority to, U.S. patent application Ser. No. 16/244,745, titled "CAMERA ENVIRONMENT MAPPING" and filed Jan. 10, 2019, the disclosure of which is hereby incorporated by reference in its entirety.

BACKGROUND

Cameras are becoming ubiquitous in modern society. Whether used for security, inventory tracking, traffic cameras, or otherwise, cameras are used by businesses of all sizes. However, these cameras are limited to image collection without generating any environment mapping unless they are preprogrammed, part of a proprietary network, or expensive to set up. Current techniques to map an environment rely on specific hardware sensors, such as depth sensor or a specific arrangement or knowledge of camera location or positioning in order to map an environment.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
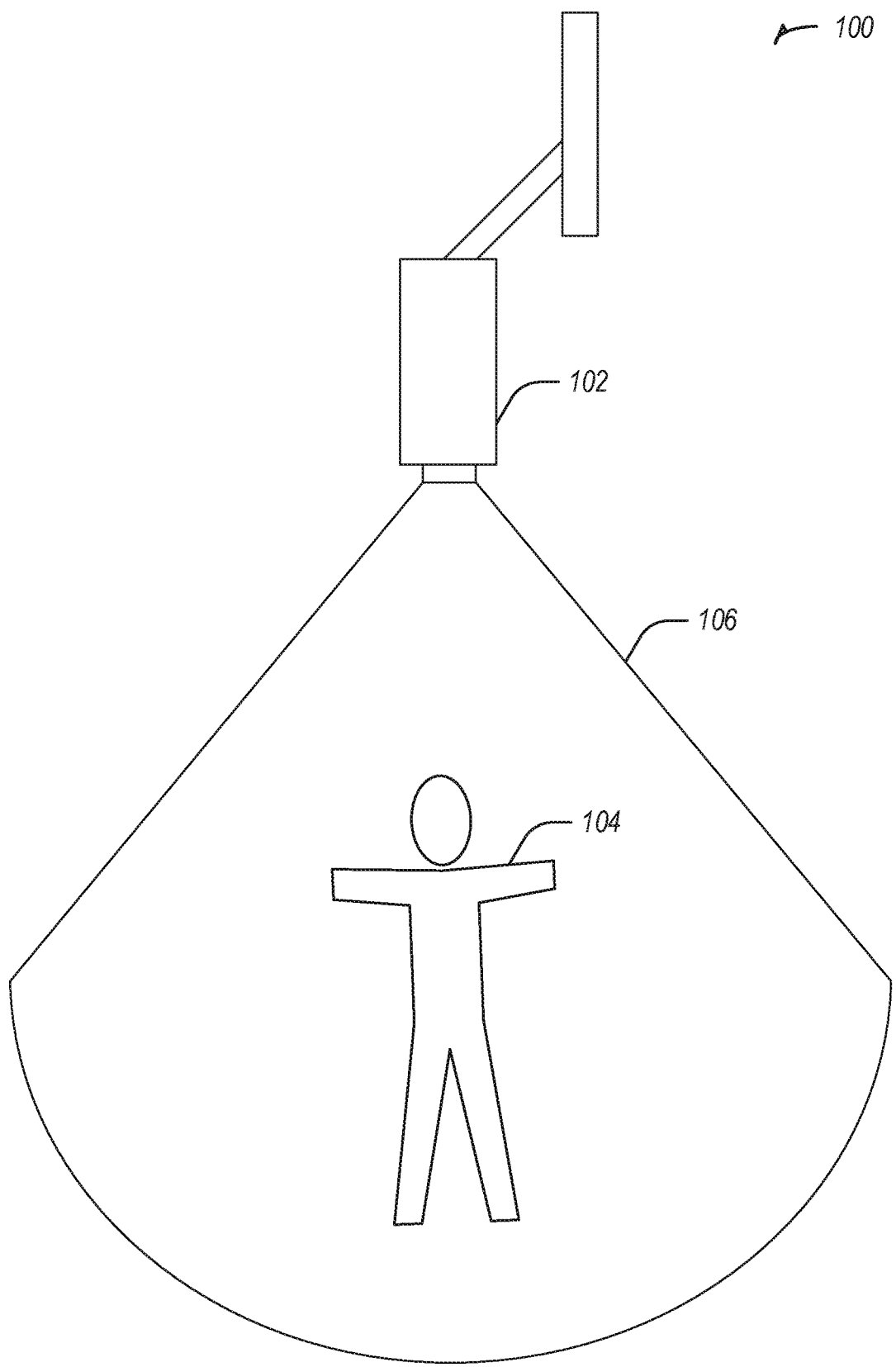
FIG. 1 illustrates a diagram including a camera and illustrating an environment of the camera visible in an image captured by the camera in accordance with some embodiments.

Systems and methods for mapping an environment observable via a camera are described herein. The systems and methods described herein may map the environment without any prior knowledge of camera extrinsics, such as location or position (e.g., angle). The camera may be a camera without a hardware-based depth sensor. The camera may be a black and white camera, a color camera (e.g., a red-green-blue (RGB) camera), a laser, an infrared camera, a sensory capture device, a sensor-based detector, or the like.

The systems and methods described herein map an environment observable via a camera using information from movement of an object within images captured by the camera. Movement of the object, such as a person, may be used to determine a floor plane of the environment observable via the camera. The floor plane may be a 2D plane within a 3D environment. The floor plane may be determined by observing the object in two or more different images (e.g., frames) taken by the camera. An orientation of the object may be automatically determined from the images, including a first portion of the object in contact or adjacent to the floor of the environment, and a second portion of the object opposite the first portion. For example, when the object is a person, the person's foot or feet may be identified in a first frame and a second frame as the first portion, with the person's head or upper torso being the second portion, such as by using skeletal tracking of the person. The orientation of the person may be used to aid in tracking movement of the person throughout the environment. In an example, locations of the person's foot or feet (or, for example, an average location between the person's feet) may be used to map the floor. The two or more frames do not need to be consecutive or in order in time. The systems and techniques described herein use at least two frames which include the object in different locations (e.g., displaced).

In an example, the object may be an animal (e.g., a dog), a robotic device (e.g., an autonomous vacuum), or the like. Any object may be used that has a determinable height (e.g., may be estimated based on an image of the object or assumed, such as an estimated height of a person), the height remaining generally fixed, and which object has contact with the floor (e.g., like a foot, the object does not have to be always touching the floor, but contacts the floor when walking).

After a floor plane is mapped, other aspects of the environment visible in an image captured by a camera may be determined. For example, a heat map of movement may be generated, a location of furniture (e.g., furniture that a person sits or lays on or furniture that is not used to support to a person, such as a bookshelf or table), or entry or exit points (e.g., a door) may be generated. The floor plane, with or without additional aspects of the environment may be displayed, for example on a user interface of a display device.

A floor plane for an environment observable via a camera, such as by using skeletal tracking to estimate locations of a person's foot or feet (or locations between or adjacent to a person's foot or feet), may be generated without any predetermined information. For example, knowledge of information within the environment, or knowledge of information related to camera location, placement, or angle, may not be known, but the floor plane may still be determined using the systems and methods described herein. Previous techniques for determining environment information relied on predetermined knowledge of some aspect of the environment or camera location, position, or angle. The present systems and methods improve camera effectiveness for security, tracking, inventory, or the like, by generating information (e.g., the floor plane) otherwise not determinable. The present systems and methods also improve camera effectiveness by not requiring any predetermined knowledge or setup, allowing for a cheaper camera to be used, an after-market solution to be implemented, or floor plane generation without technical expertise required at the time of generation of the floor plane.

The following sections describe in detail the systems and methods that may be used to deduce a relationship between a camera (e.g., a single fixed-position RGB camera) and the floor plane the camera observes, using only the camera's intrinsics and image-space labeled observations of an object, such as a human skeleton captured in the scene by the camera. In an example, skeletal tracking may be performed, for example according to the techniques described in U.S. Publication US20120056800A1, which is incorporated herein in its entirety.

FIG. 1 illustrates a diagram 100 including a camera 102 and illustrating an environment 106 visible in an image captured by the camera in accordance with some embodiments. Within the environment 106, a person 104 is visible. The person 104 is tracked while moving throughout the environment 106, and from this data, a floor plane of the environment 106 is generated. In another example, an object other than a person may be tracked, when moving, to generate a floor plane.

In an example, the camera 102 is a camera without hardware-based depth sensors. For example, the camera 102 may be a typical RGB camera. For example, the camera 102 may include one or more charge coupled device (CCD) sensors, complementary metal-oxide semiconductor (CMOS) sensors, N-type metal-oxide semiconductors (NMOS), or other light sensors. The camera 102 may include two or more cameras in other examples. The camera 102 may be a black and white or greyscale camera, or an infrared camera in some examples.

The camera 102 may detect a mobile object in the environment 106. The mobile object may be the person 104. The person 104 may be tracked as the person 104 moves through the environment 106. This may be done using skeletal tracking of the person 104. The environment 106 may be identified in an image captured by the camera 102 as a plurality of pixels. The pixels may be classified as being either part of the person 104 or background. Based on the pixels identified as part of the person 104, joints and a skeleton may be identified for the person 104. The skeleton may include line segments connecting the identified joints.

As the person 104 moves throughout the environment 106, different pixels may be identified as corresponding to the person 104. From the joints or the skeleton pixels, pixels corresponding to a floor plane may be identified based on the movement of the person 104 over time. For example, a time sequence or a similarity of image data may be used to identify floor plane pixels. The time sequence may include a time series of images, with the floor plane pixels determined from the series, or the time sequence may use a specific confidence level of image data captured by the camera to identify floor plane pixels. The similarity of image data may include using multiple cameras and time-aligning output (e.g., pixels of the person 104 at particular times) and identifying similarities to determine floor plane pixels.

The skeleton and joints may be used to extract a lower limb from the image data of the mobile object captured by the camera 102 over time. Based on the skeleton and the lower limb, a pixel or point may be identified that is likely to be located next to an object (e.g., a foot pixel or point may be identified that would likely be next to a floor pixel, or on top of a floor).

Different floor pixels or points may be identified when the person 104 moves. These pixels or points may be identified using an assumed height of the person 104 and projective geometry. The assumed height is constant while the person 104 moves, thus different pixel distances from a distal end of a lower limb pixel to a head, shoulder, upper body, etc., pixel may be used to determine distance moved by the person 104. In another example, an orthogonality of the person 104 to the floor may be assumed instead of or in addition to the height assumption.

A floor plane map, 2D or 3D, of the space being observed (within the environment 106) may be based on the inferred floor from the skeleton information extracted from the image data of the mobile object (e.g., the person 104), captured by the camera 102 over time. In an example, a heat map of the movement of the person 104 or other objects may be created after the floor plane is generated.

Figure 2:
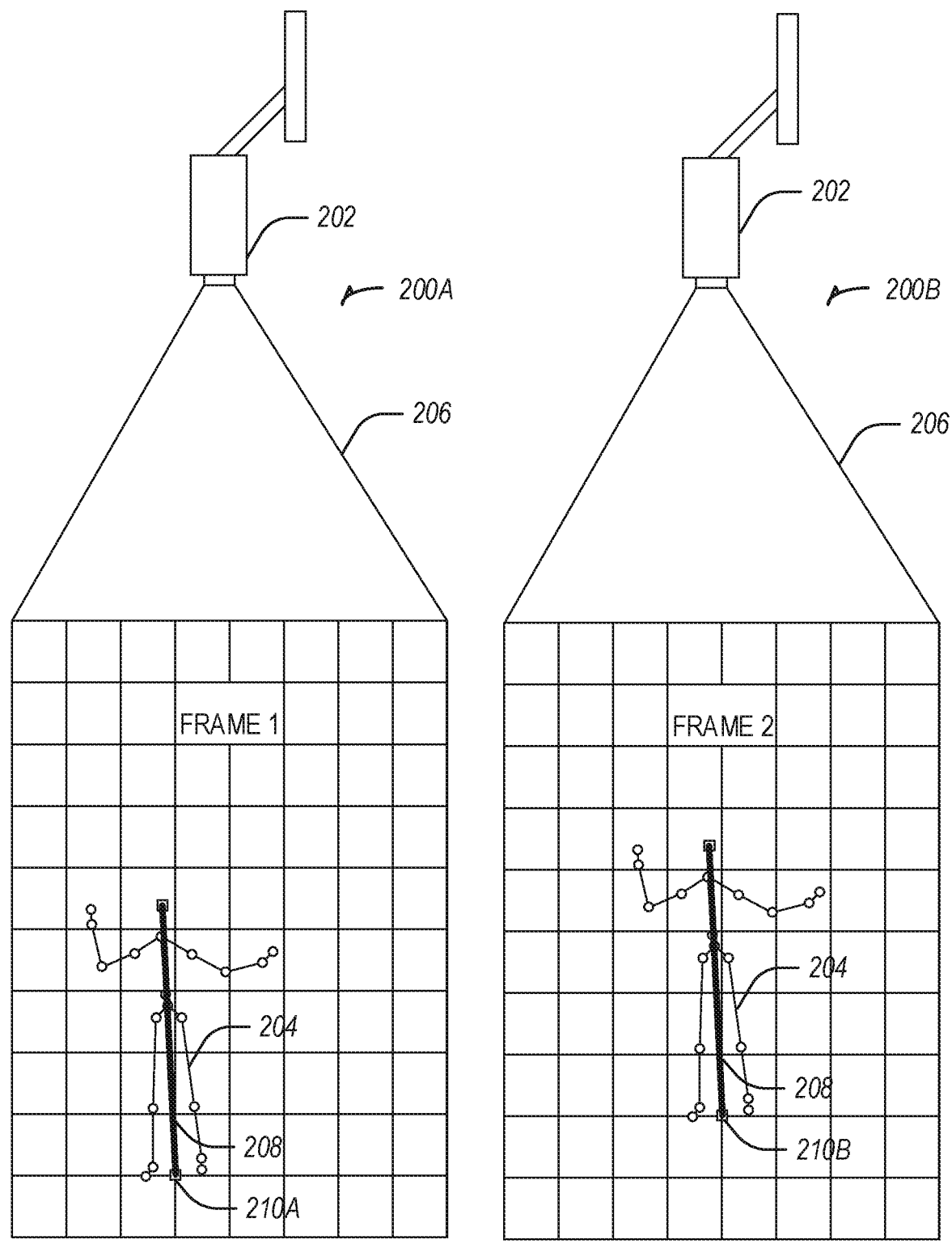
FIG. 2 illustrates two frames of an environment observable via a camera in accordance with some embodiments.

FIG. 2 illustrates two frames 200A and 200B of an environment 206 of a camera 202 in accordance with some embodiments. To determine the floor plane (and the floor depth in an arbitrary scale) from the camera 102, which may be a fixed-position single-camera, skeleton observations are used along with one or more assumptions about people and floors. For example, one or more of the following may be assumed: 1. floors are planar; 2. a person does not change size across brief timespans; 3. gravity is present and constant across the observed region; 4. a person present in the environment is oriented parallel to a gravity vector (e.g., the person is standing and walking such that their head is substantially directly above their feet); 5. feet are touching, proximate, or very near to the floor.

The camera 202 may be used to capture images, such as frame 200A and 200B at different times. From the images, a set of skeleton observations of a single individual (e.g., person 204) over a constrained time period can be generated. Using the assumptions listed above, in an example, a floor plane or a 3D person trajectory may be generated from the set of skeleton observations.

The frames 200A and 200B include details that may be generated after capture by the camera 202 for illustrative purposes. For example, the person 204 is shown with an identified primary axis 208 and a foot endpoint 210A (which may be a point between the feet of the person 204, or another location, such as a point at an intersection of a segment connecting the feet of the person and the primary axis). The primary axis 208 and the foot endpoint 210A may be generated from the frames 200A and 200B, but do not appear in the originally captured images from the camera 202.

The primary axis 208 is an axis of the person 204 as the person stands, walks, runs, or otherwise moves, for example from frame 200A to 200B on a floor. In an example, the primary axis 208 is a 3D line segment extending from a point in an upper body portion of the person 204, such as the person's head, shoulders, chest, etc., to the floor directly underneath (or to the person's feet or a point between the feet). Other examples of the primary axis 208 may start from the person's 204 neck to the floor, from a center of mass of the person 204 to the floor, from the head to a midpoint of hips or knees of the person, or the like. In an example, the primary axis 208 may be defined such that it is substantially perpendicular to the floor (e.g., not at an angle, such as from the neck to the right foot, because the orientation of the segment from the foot to the neck may change through the different phases of a step). In an example, the primary axis 208 may be any axis in which the magnitude and orientation of the axis of the person 204 remains relatively unvarying through the typical motions of standing and walking. In an example, when the person 204 is not standing or walking the primary axis 208 may not exist or those frames or images may be disregarded.

The above listed assumptions may be restated in terms of the primary axis 208. For example, assumption 2 may be restated as the length of the primary axis 208 (in 3D, for example) of a given individual remains approximately constant across all temporally proximate observations of that individual (e.g., from frame to frame). Assumption 3 may be restated as all apparent primary axes are acted upon by the same force of gravity. Assumption 4 may be restated as the primary axis 208 is approximately parallel to a gravity vector, with the foot endpoint 210A at a "down" end of the primary axis 208 (e.g., most proximate to the floor). Assumption 5 may be restated that the foot endpoint 210A is always proximate in space to the floor plane.

These assumptions about the floor plane, the primary axis 208, and the relationships between them provide sufficient information to calculate a floor plane solely from 2D skeleton observations of the person 204 using a single camera 202. A sequence of images from the camera 202 may be used to generate a set of skeleton observations O.

For each 2D labeled skeleton in O, the image-space positions for the projections of the foot endpoints 210A and 210B of the primary axis may be calculated. In an example, the positions may be generated using geometric estimation, machine learning, the "midpoint of feet" approximation described above, or the like. The set O may be used to generate a matching set of axis endpoints A, where every element a in A contains a pair of 2D positions ($h_2$:=position of head, $f_2$ foot endpoint, e.g., 210A or 210B) for a corresponding element o in O.

For all primary axes a in A, $a.h_2$ and $a.f_2$ are 2D points which correspond to the image-plane projections of unknown 3D points $a.h_3$ and $a.f_3$, respectively. Using projective geometry, a ray that the position of a 3D point lies on may be determined by the 2D projection and the observing camera 202. The primary axes a may be 3D vectors, for example defined by a point and a ray (e.g., a direction and a length). Other definitions of a primary axis may include a line segment connected by two specified endpoints (e.g., 3D position points), or the like.

Using the assumptions that the floor is planar and that the foot endpoints 210A and 210B tend to lie on or near the floor, the floor plane may be determined as a 3D plane which most nearly contains (or underlies, which is the equivalent to within a scale difference) the foot positions $a.f_3$ for all a in A.

In an example, $a.h_3$ and $a.f_3$ are a constant distance apart for all a in A, for example based on assumption 2. In an example, a determined scale for the floor plane may be relative to the other objects in the environment. For example, absolute scale may not be generated. Thus, knowing or determining numeric distance between the 3D endpoints may not be needed. The primary axis may use this feature of the system without loss of generality, where $\|a.h_3 - a.f_3\| - 1$ for all a in A.

Turning now to the assumption that, given a unit vector g which represents the direction of gravity (e.g., pointing toward the center of the earth), the dot product of g and $(a.f_3 - a.h_3)$ equals 1 (the distance between head and feet may be defined to be 1, in an example). These two unit vectors are identical. Using the assumption that g is constant for all a in A, it follows that a third constraint on the system is $(a.f_3 - a.h_3) \cdot (b.f_3 - b.h_3) = 1$ for all a and b in A.

Given the observing camera 202, $a.h_3$ projects to $a.h_2$ and $a.f_3$ projects to $a.f_2$ in the environment for all a in A. $\|a.h_3 - a.f_3\|\lambda = 1$ for all a in A. $(a.f_3 - a.h_3) \cdot (b.f_3 - b.h_3) = 1$ for all a and b in A.

In an example, the floor plane is estimated from a close approximation to the solution to these constraints. In an example, an optimizer is generated to iteratively apply (attempt to fit) $\|a.h_3 - a.f_3\| = 1$ and $(a.f_3 - a.h_3) \cdot (b.f_3 - b.h_3) = 1$ while ensuring that $a.h_3$ projects to $a.h_2$ and $a.f_3$ projects to $a.f_2$. In another example, a general-purpose nonlinear optimization tool may be used to estimate the floor plane from these equations.

After an optimized or estimated solution to the above-described system is determined, the floor plane may be recovered from the 3D positions of the feet (e.g., endpoints 210A and 210B). The floor plane may be defined by a point p and a normal vector n. In an example, the floor plane may be the result of setting p to the average of $a.f_3$ and n to the average of $(a.h_3\ a.f_3)$ for all a in A. In another example, p and n maybe determined from the values of a single primary axis (e.g., 208 in frame 200A), then use random sample consensus (RANSAC) or similar algorithm to find which axis produces the best fit floor plane.

The technique described herein may be used to generate a floor plane using very few elements in A, and correspondingly O. For example, the floor plane may be generated when A contains at least two elements a and b such that $\|a.h_2 - a.f_2\| \neq \|b.h_2 - b.f_2\|$. Because measurements may be noisy and assumptions are approximate, it may be useful to have many observations in order to prevent erroneous inputs from corrupting the output.

In another example, a technique may relax or not use some of these constraints or assumptions, or substitute other constraints or assumptions while still achieving high-quality results in generating a floor plane. For example, relaxing the single-individual requirement, multiple people may be tracked. In another example, a simplified assumption of 4, above to a definition that $(a.h_3 - a.f_3)$ is orthogonal to the view direction of the camera 202 for all a in A may be used. In an example, tuning the parameters of a nonlinear optimizer to allow it to "bend" the constraints in order to resolve the resulting inconsistencies may incorporate these differences in assumptions to still generate a floor plane.

Figure 3:
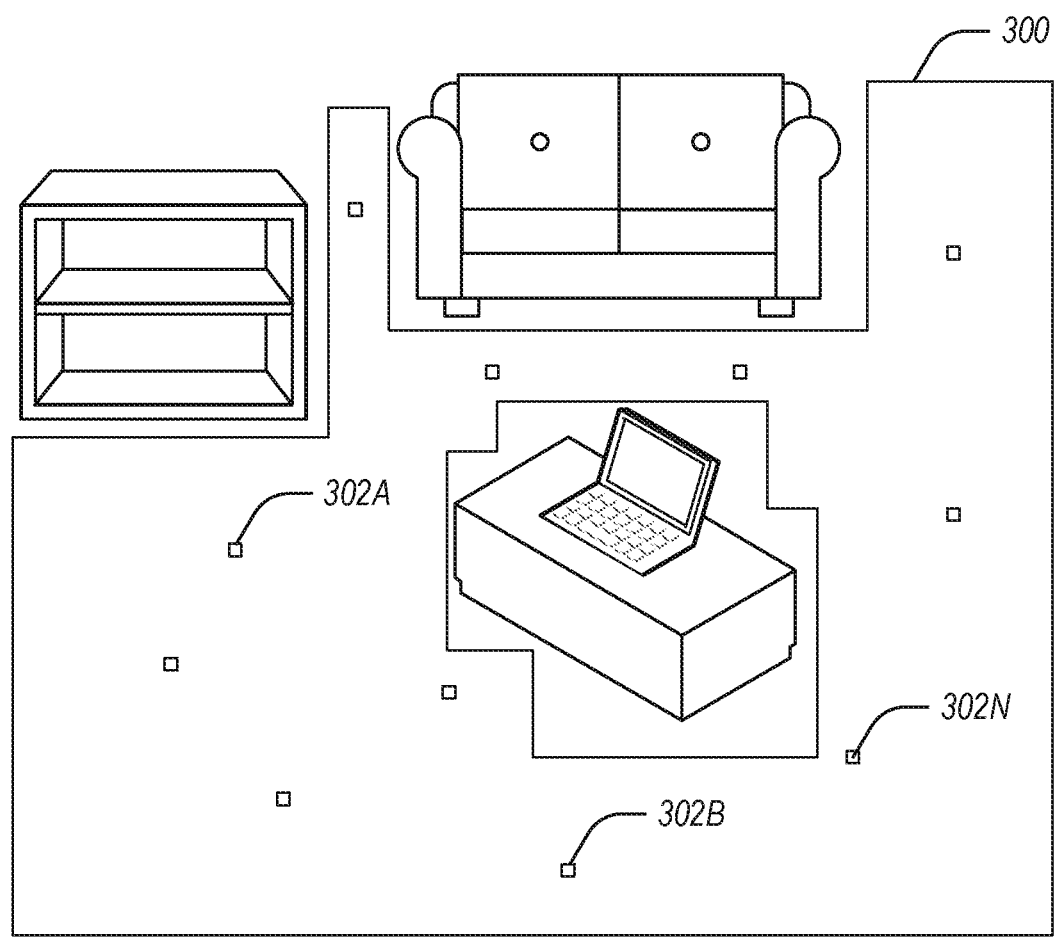
FIG. 3 illustrates a floor map generated in accordance with some embodiments.

FIG. 3 illustrates a floor map 300 generated in accordance with some embodiments. The floor map 300 may be an output of the systems and techniques described herein. The floor map 300 illustrates a 3D or 2D representation of a floor plane within an environment. Points or pixels 302A, 302B, . . . 302N represent foot endpoints generated using the systems and techniques described herein. The floor map 300 may be a best fit or approximation of the points or pixels 302A-302N. In an example, a floor plane is defined by a point, for example 302A, and a vector, for example a line connecting point 302B to 302N. Based on the floor plane, the floor map 300 may be generated, for example based on locations of movement of a person throughout an environment. Other outputs may include the floor plane coordinates (e.g., the point and vector), a camera orientation (e.g., location or angle) to the floor plane (e.g., a six-axis orientation of x,y,z and pitch, yaw, roll relative to "ground"). In an example, from the floor map 300 and movement data of a person throughout the environment, a heat map may be generated, showing, for example locations a person sits, stands, stops, or moves along.

Figure 4:
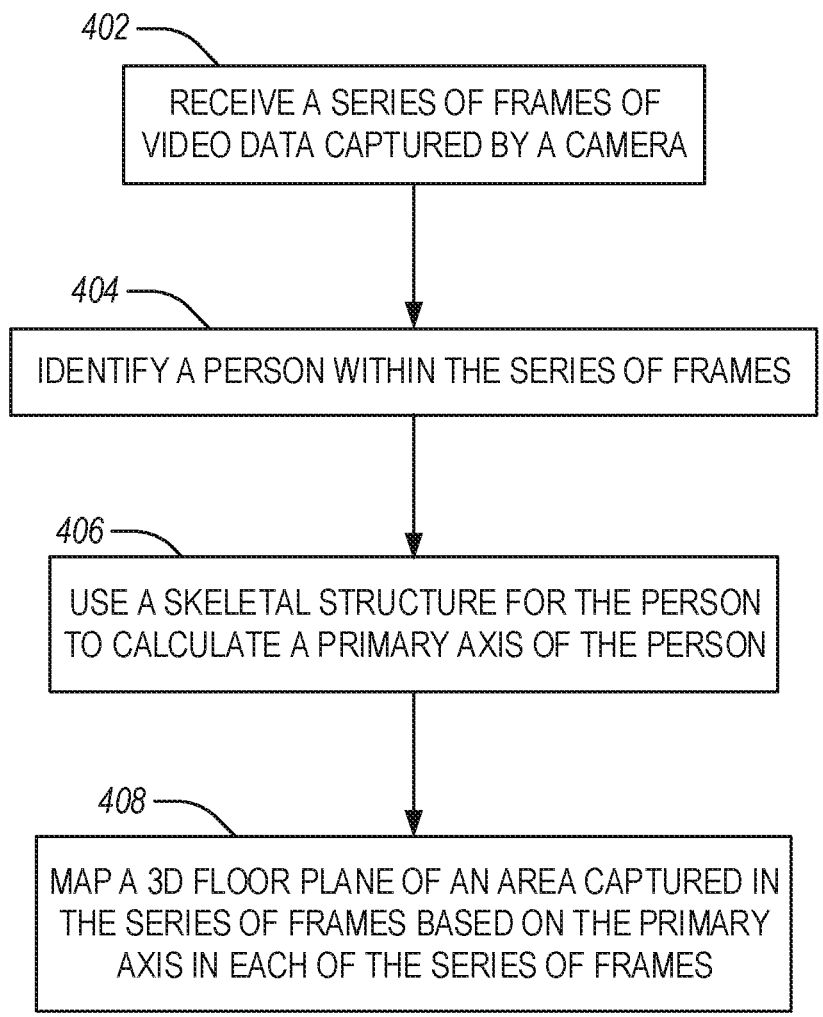
FIG. 4 illustrates a flowchart showing a technique for mapping a camera environment accordance with some embodiments.

FIG. 4 illustrates a flowchart showing a technique 400 for mapping a camera environment in accordance with some embodiments. The technique 400 includes an operation 402 to receive a series of frames or images, such as of video data captured by a camera. In an example, the camera lacks any hardware-based depth sensing capabilities. The technique 400 includes an operation 404 to identify a person or other object (e.g., a moving object or a moveable object) within the series of frames.

The technique 400 includes an operation 406 to use a skeletal structure for the person to calculate a primary axis of the person, for example including a foot endpoint. Other operations may be substituted for operation 406, such as using different object recognition techniques to identify an object, including orientation of the object, for example. In an example, the primary axis is a line segment extending from a head of the person to a midpoint of two feet of the person.

The technique 400 includes an operation 408 to generate a map or map a 3D space. The map may include a 3D floor plane of an area captured in the series of frames based on the primary axis in each of the series of frames, for example based on identified locations of the foot endpoint in each of the series of frames. The camera may be a single camera, the 3D floor plane mapped based solely on data received from the single camera. The 3D floor plan may be mapped based on an assumption that the primary axis of the person varies based on distance from the camera while a height of the person remains constant. For example, the 3D floor plane is mapped based on an assumption that the primary axis is parallel to a gravity vector. The technique 400 may include determining an angle of orientation of the camera with respect to the 3D floor plane of the area.

Figure 5:
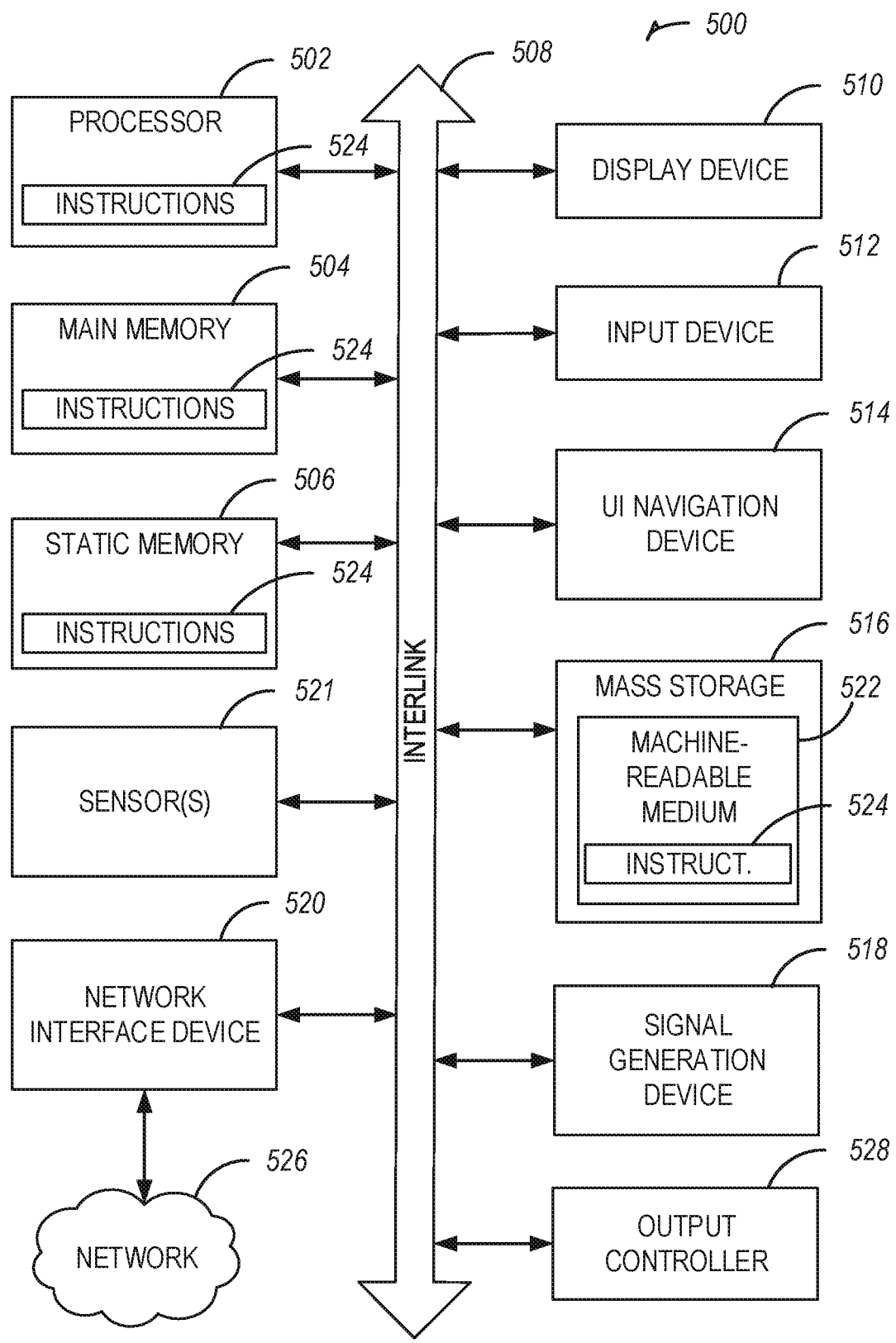
FIG. 5 illustrates generally an example of a block diagram of a machine upon which any one or more of the techniques discussed herein may perform in accordance with some embodiments.

FIG. 5 illustrates generally an example of a block diagram of a machine 500 upon which any one or more of the techniques (e.g., methodologies) discussed herein may perform in accordance with some embodiments. In alternative embodiments, the machine 500 may operate as a standalone device or may be connected (e.g., networked) to other machines. In a networked deployment, the machine 500 may operate in the capacity of a server machine, a client machine, or both in server-client network environments. In an example, the machine 500 may act as a peer machine in peer-to-peer (P2P) (or other distributed) network environment. The machine 500 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In an example, the hardware may include configurable execution units (e.g., transistors, circuits, etc.) and a computer readable medium containing instructions, where the instructions configure the execution units to carry out a specific operation when in operation. The configuring may occur under the direction of the executions units or a loading mechanism. Accordingly, the execution units are communicatively coupled to the computer readable medium when the device is operating. In this example, the execution units may be a member of more than one module. For example, under operation, the execution units may be configured by a first set of instructions to implement a first module at one point in time and reconfigured by a second set of instructions to implement a second module.

Machine (e.g., computer system) 500 may include a hardware processor 502 (e.g., a central processing unit (CPU), a graphics processing unit (GPU), a hardware processor core, or any combination thereof), a main memory 504 and a static memory 506, some or all of which may communicate with each other via an interlink (e.g., bus) 508. The machine 500 may further include a display unit 510, an alphanumeric input device 512 (e.g., a keyboard), and a user interface (UI) navigation device 514 (e.g., a mouse). In an example, the display unit 510, alphanumeric input device 512 and UI navigation device 514 may be a touch screen display. The machine 500 may additionally include a storage device (e.g., drive unit) 516, a signal generation device 518 (e.g., a speaker), a network interface device 520, and one or more sensors 521, such as a global positioning system (GPS) sensor, compass, accelerometer, or other sensor. The machine 500 may include an output controller 528, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 516 may include a machine readable medium 522 that is non-transitory on which is stored one or more sets of data structures or instructions 524 (e.g., software) embodying or utilized by any one or more of the techniques or functions described herein. The instructions 524 may also reside, completely or at least partially, within the main memory 504, within static memory 506, or within the hardware processor 502 during execution thereof by the machine 500. In an example, one or any combination of the hardware processor 502, the main memory 504, the static memory 506, or the storage device 516 may constitute machine readable media.

While the machine readable medium 522 is illustrated as a single medium, the term "machine readable medium" may include a single medium or multiple media (e.g., a centralized or distributed database, or associated caches and servers) configured to store the one or more instructions 524.

The term "machine readable medium" may include any medium that is capable of storing, encoding, or carrying instructions for execution by the machine 500 and that cause the machine 500 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 524 may further be transmitted or received over a communications network 526 using a transmission medium via the network interface device 520 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 520 may include one or more physical jacks (e.g., Ethernet, coaxial, or phone jacks) or one or more antennas to connect to the communications network 526. In an example, the network interface device 520 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 500, and includes digital or analog communications signals or other intangible medium to facilitate communication of such software.

Each of these non-limiting examples may stand on its own, or may be combined in various permutations or combinations with one or more of the other examples.

Example 1 is a device for mapping an environment observable via a camera, the device comprising: a processor; and memory, communicatively coupled to the processor, the memory including instructions, which when executed, cause the processor to: receive a series of frames of video data captured by the camera; identify a person within the series of frames; based on a determined skeletal structure for the person in each of the series of frames, calculate a primary axis of the person, the primary axis including a foot endpoint; and map a 3D floor plane of an area captured in the series of frames based on identified locations of the foot endpoint in each of the series of frames.

In Example 2, the subject matter of Example 1 includes, wherein the camera lacks any hardware-based depth sensing capabilities.

In Example 3, the subject matter of Examples 1-2 includes, wherein the primary axis is a line segment extending from a head of the person to a midpoint between two feet of the person.

In Example 4, the subject matter of Examples 1-3 includes, wherein the camera is a single camera, the 3D floor plane mapped based solely on data received from the single camera.

In Example 5, the subject matter of Examples 1-4 includes, wherein the 3D floor plane is mapped based on an assumption that the primary axis of the person varies based on distance from the camera while a height of the person remains constant.

In Example 6, the subject matter of Examples 1-5 includes, wherein the 3D floor plane is mapped based on an assumption that the primary axis is parallel to a gravity vector.

In Example 7, the subject matter of Examples 1-6 includes, wherein the instructions further cause the processor to determine an angle of orientation of the camera with respect to the 3D floor plane of the area.

Example 8 is a method for mapping an environment observable via a camera, the method comprising: receive, at a processor, a series of frames of video data captured by a camera; identify, using the processor, a person within the series of frames; based on a determined skeletal structure for the person in each of the series of frames, calculate a primary axis of the person, the primary axis including a foot endpoint; generating, using the processor, a map of a 3D floor plane of an area captured in the series of frames based on identified locations of the foot endpoint in each of the series of frames; and outputting the map.

In Example 9, the subject matter of Example 8 includes, wherein the camera lacks any hardware-based depth sensing capabilities.

In Example 10, the subject matter of Examples 8-9 includes, wherein the primary axis is a line segment extending from a head of the person to a midpoint of two feet of the person.

In Example 11, the subject matter of Examples 8-10 includes, wherein the camera is a single camera, the 3D floor plane mapped based solely on data received from the single camera.

In Example 12, the subject matter of Examples 8-11 includes, wherein the 3D floor plane is mapped based on an assumption that the primary axis of the person varies based on distance from the camera while a height of the person remains constant.

In Example 13, the subject matter of Examples 8-12 includes, wherein the 3D floor plane is mapped based on an assumption that the primary axis is parallel to a gravity vector.

In Example 14, the subject matter of Examples 8-13 includes, determining an angle of orientation of the camera with respect to the 3D floor plane of the area.

Example 15 is an apparatus for mapping an environment observable via a camera, the apparatus comprising: means for receiving a series of frames of video data captured by a camera; means for identifying a person within the series of frames; means for, based on a determined skeletal structure for the person in each of the series of frames, calculating a primary axis of the person, the primary axis including a foot endpoint; means for mapping a 3D floor plane of an area captured in the series of frames based on identified locations of the foot endpoint in each of the series of frames; and means for outputting the 3D floor plane for display.

In Example 16, the subject matter of Example 15 includes, wherein the camera is a single camera, the 3D floor plane mapped based solely on data received from the single camera.

In Example 17, the subject matter of Examples 15-16 includes, wherein the camera lacks any hardware-based depth sensing capabilities.

In Example 18, the subject matter of Examples 15-17 includes, wherein the primary axis is a line segment extending from a head of the person to a midpoint of two feet of the person.

In Example 19, the subject matter of Examples 15-18 includes, wherein the 3D floor plane is mapped based on an assumption that the primary axis of the person varies based on distance from the camera while a height of the person remains constant.

In Example 20, the subject matter of Examples 15-19 includes, determining an angle of orientation of the camera with respect to the 3D floor plane of the area.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

Method examples described herein may be machine or computer-implemented at least in part. Some examples may include a computer-readable medium or machine-readable medium encoded with instructions operable to configure an electronic device to perform methods as described in the above examples. An implementation of such methods may include code, such as microcode, assembly language code, a higher-level language code, or the like. Such code may include computer readable instructions for performing various methods. The code may form portions of computer program products. Further, in an example, the code may be tangibly stored on one or more volatile, non-transitory, or non-volatile tangible computer-readable media, such as during execution or at other times. Examples of these tangible computer-readable media may include, but are not limited to, hard disks, removable magnetic disks, removable optical disks (e.g., compact disks and digital video disks), magnetic cassettes, memory cards or sticks, random access memories (RAMs), read only memories (ROMs), and the like.

What is claimed is:

1. A device for mapping an environment, the device comprising:
    a processor; and
    memory, communicatively coupled to the processor, the memory including instructions, which when executed, cause the processor to:
    receive a set of frames of video data captured by a camera;
    identify an object within the set of frames;
    identify, based on a determined structure of the object in at least two frames of the set of frames, an axis of the object, the axis including an endpoint in contact with a surface of the environment;
    and
    generate, without using extrinsic properties of the camera, a plane map including a plane of a non-living surface of the environment that is captured in the at least two frames of the set of frames, the plane map generated based on, a prespecified height of the object, a first identified location of the endpoint in a first of the at least two frames of the set of frames and a second, different identified location of the endpoint in a second of the at least two frames of the set of frames, the generating of the plane map comprising generating a mathematical description of the plane.

2. The device of claim 1, wherein the camera lacks any hardware-based depth sensing capabilities.

3. The device of claim 1, wherein the axis is a line segment extending from a point at a first end of the object to a midpoint between two points at an opposite end of the object.

4. The device of claim 1, wherein the camera is a single camera, and the plane map is generated based solely on data received from the single camera.

5. The device of claim 1, wherein the plane map is generated based on an assumption that the axis of the object varies based on distance from the camera while a height of the object remains constant.

6. The device of claim 1, wherein the plane map is generated based on an assumption that the axis is parallel to a gravity vector.

7. The device of claim 1, wherein the instructions further cause the processor to determine an angle of orientation of the camera with respect to the plane map of the environment.

8. A method for mapping an environment, the method comprising:
    receive, at a processor, at least two frames of video data captured by a camera;
    identifying, using the processor, an object within the at least two frames;
    identifying, based on a determined structure of the object in the at least two frames, an axis of the object, the axis including an endpoint in contact with a surface of the environment;
    generate, using the processor and without using extrinsic properties of the camera, a plane map including a plane of a non-living surface of the environment that is captured in the at least two frames, the plane map generated based on, a prespecified height of the object, a first identified location of the endpoint in a first of the at least two frames and a second, different identified location of the endpoint in a second of the at least two frames, the generating of the plane map comprising generating a mathematical description of the plane; and
    outputting the plane map.

9. The method of claim 8, wherein the camera lacks any hardware-based depth sensing capabilities.

10. The method of claim 8, wherein the axis is a line segment extending from a point at a first end of the object to a midpoint of two points at an opposite end of the object.

11. The method of claim 8, wherein the camera is a single camera, and the plane map is generated based solely on data received from the single camera.

12. The method of claim 8, wherein the plane map is generated based on an assumption that the axis of the object varies based on distance from the camera while a height of the object remains constant.

13. The method of claim 8, wherein the plane map is generated based on an assumption that the axis is parallel to a gravity vector.

14. The method of claim 8, further comprising determining an angle of orientation of the camera with respect to the plane map of the environment.

15. An apparatus for mapping an environment, the apparatus comprising:
    means for receiving a set of frames of video data captured by a camera;
    means for identifying an object within the set of frames;
    means for identifying, based on a determined structure of the object in at least two frames of the set of frames, an axis of the object, the axis including an endpoint in contact with a surface of the environment;
    means for generating, without using extrinsic properties of the camera, a plane map including a plane of a non-living surface of the environment that is captured in the at least two frames of the set of frames, the plane map generated based on, a prespecified height of the object, a first identified location of the endpoint in a first of the at least two frames of the set of frames and a second, different identified location of the endpoint in a second of the at least two frames of the set of frames, the generating of the plane map comprising generating a mathematical description of the plane; and
    means for outputting the plane map for display.

16. The apparatus of claim 15, wherein the camera is a single camera, and wherein the plane map is generated based solely on data received from the single camera.

17. The apparatus of claim 15, wherein the camera lacks any hardware-based depth sensing capabilities.

18. The apparatus of claim 15, wherein the axis is a line segment extending from a point at a first end of the object to a midpoint between two points at an opposite end of the object.

19. The apparatus of claim 15, wherein the plane map is generated based on an assumption that the axis of the object varies based on distance from the camera while a height of the object remains constant.

* * * * *